United States Patent
Fletcher et al.

[11] 3,923,166
[45] Dec. 2, 1975

[54] REMOTE MANIPULATOR SYSTEM

[76] Inventors: James C. Fletcher, Administrator of the National Aeronautics and Space Administration, with respect to an invention of; Donald A. Kugath, Frazer, Pa.; Dan H. Dane, Huntsville; Herman T. Blaise, Gunterville, both of Ala.

[22] Filed: Oct. 11, 1973

[21] Appl. No.: 405,341

[52] U.S. Cl. .................................. 214/1 CM
[51] Int. Cl.² ................................. B25J 3/04
[58] Field of Search ..................... 214/1 CM

[56] References Cited
UNITED STATES PATENTS

| | | | |
|---|---|---|---|
| 3,043,448 | 7/1962 | Melton | 214/1 CM |
| 3,241,687 | 3/1966 | Orloff | 214/1 CM |
| 3,451,224 | 6/1969 | Colechia | 214/1 CM |
| 3,535,711 | 10/1970 | Fick | 3/1.2 |
| 3,648,143 | 3/1972 | Harper | 214/1 CM X |

OTHER PUBLICATIONS
Remote Control Engineering, Nucleonics, Cover & p. 33, a McGraw–Hill Publication, Nov., 1952.

*Primary Examiner*—Robert J. Spar
*Assistant Examiner*—George F. Abraham
*Attorney, Agent, or Firm*—George J. Porter; L. D. Wofford, Jr.; John R. Manning

[57] ABSTRACT

A master-slave manipulator system with two master units controlled by the two arms and hands of an operator and two corresponding slave units. Both the master and the slave units have a first arm rotatably mounted to the floor at 30° from the vertical, a second arm pivoted to it and mounted for rotation, and a third arm pivoted to the second arm. The slave has a pivotally and rotatably mounted gripper unit while the master has a pivotally mounted unit with manual switch controls. The servomechanism system includes a solid-state control circuit, and flat, helically wound, internal ribbons of wires.

7 Claims, 5 Drawing Figures

REMOTE MANIPULATOR SYSTEM

ORIGIN OF THE INVENTION

This invention described herein was made in the performance of work under a NASA contract and is subject to the provisions of Section 305 of the National Aeronautics and Space Act of 1958, Public Law 85–568 (72 Stat. 435, 42 U.S.C. 2457).

BACKGROUND OF THE INVENTION

This invention relates to manipulator mechanisms for the physical movement of items, and, more specifically, relates to master members operated by a person to control slave members of form similar to the master members.

The three general types of remotely operated manipulators of the kind of interest are the pedestal mounted, hand-held, hot-laboratory type; the exoskeleton, anthropomorphic type; and the joystick-controlled, semi-anthropomorphic type.

The hot-laboratory type derives its name from the early application of manipulating items in an isolated or "hot" area, wherein radioactive elements are handled. It is characterized by a master unit, only the end element of which is directly manipulated. The other articulated elements take a position as forced by the positioning of the end element. The posture of the master unit is communicated to and controls the slave unit.

Advantages of the hot-laboratory type comprise:

1. Large working volume — The manipulators are not restricted to the length of the human arm, and are thus limited in reach only by their own geometry. The small manipulators usually can reach about twice as far as a stationary operator.

2. Unrestricted working positions — The operator is not tied to the master or to a fixed spot. This allows the operator to fully utilize the working volume of the manipulator by taking a step toward something he cannot reach. The operator can change his position for his own comfort to help reduce fatigue, and the operator requires no aid to get into the master. The operator can also move out of his own way to move the manipulator through where he would normally be standing.

3. Full circumferential freedom — A typical pedestal mounting allows the slave arms to utilize their full working volume.

4. Moderate skill for operation — The controls are simple, but some operator training is required to learn to operate the manipulators. Since the slave end effector follows the master end effector, the control is natural.

5. Low fatigue where the master is spring loaded.

6. Compatibility for addition of force feedback and most other options.

7. Very smooth operation.

Undesirable aspects of the hot-laboratory type are as follows:

1. High operator fatigue — An operator can only perform skilled tasks for short periods of time.

2. Limited to five degrees of freedom — This is because movement is controlled by a hand-held master.

3. Alternate control means generally not provided — However, there is no fundamental reason why computer assist, switches, or a miniature analog control could not be added with little or no manipulator modification.

4. Operator disorientation — This is a significant factor because the operator only controls the end placement and not each joint, and is the primary reason training and practice are required to become a proficient operator.

The exoskeleton, anthropomorphic type derives its name from the physical similarity of both the master and the slave to the external configuration of the human arm and wrist.

Advantages of the exoskeleton, anthropomorphic type comprise:

1. Ease in operation — They are the most natural to learn to operate and require the least amount of operator training time of the three manipulator systems.

2. Good dexterity — They have seven degrees of freedom.

3. Good operator control — Each degree of freedom is controlled so the operator knows the position of the slave at all times.

Undesirable aspects of the exoskeleton, anthropomorphic type are as follows:

1. Operator fatigue — Without an attached counterweight mechanism, the master arms are very fatiguing to operate. Holding the arms and hands in awkward positions is very fatiguing.

2. Small working volume.

3. Reduced working volume where the operator cannot work within himself.

4. Restricted joint movement — Such movement is restricted where the operator cannot bend his elbow backward.

5. Difficulty of operation — Holding one arm stationary is difficult and fatiguing.

6. Increased cost — The master and slave are of different design, which increases cost.

7. Assistance required for operation — This is true especially when being strapped into the masters.

The joystick-controlled, semi-anthropomorphic type obtains its name from the combination of switch or joystick control employed with a slave having the external configuration of the human arm and wrist.

Advantages of the joystick-controlled, semi-anthropomorphic type comprise:

1. Limited space for controls — The joystick can be installed into a confined area.

2. Low fatigue — The joystick is not physically fatiguing.

3. Low physical demand — Joint movement is accomplished without operator contortions.

4. Individual joint control.

5. Proportional control easily available — Length of movement of the slave need not be linked to length of movement of the control.

Undesirable aspects of the joystick-controlled, semi-anthropomorphic type are as follows:

1. Long operator training — Joystick control requires the longest operator training time of the three units. The operator does not know instinctively what configuration the slave arm is in at any moment.

2. No simultaneous motion of joints — This is generally not possible.

3. No force feedback — Return of a tactile signal to a joystick is impractical.

The invention herein described combines many aspects of the above types of apparatus in an improved design. In general design approach, it is primarily a combination of the exoskeleton, anthropomorphic type with some switch control of the joystick type.

U.S. Pat. No. 3,280,991 to Melton et al represents a teaching closely similar to the general design of the instant invention in many respects. This patent describes a counterweighted master with an arm structure externally similar to the human arm. Manipulation is by movement of the far end and by switch control, which is located at the far end of the master, for the gripper elements of the slave.

In this patent the degrees of freedom of the master are the same as the hot-laboratory type, with control of other movement supplied by switches. Also, the velocity controlled joints as described in the patent are not compatible with other control variations, and if the slaves get out of sinc with the masters, it becomes impossible for the operator to control the slaves. With a simple control such as is preferred in the instant invention, indexing control by computer and other control techniques are compatible and are simply and easily implemented.

U.S. Pat. No. 3,066,805 to Sullivan teaches a switch control system of the joystick class. The slave arm configuration is similar in overall respects to that of the instant invention.

U.S. Pat. No. 3,241,687 to Orloff describes a hand operated hot-laboratory manipulator typical of that described above and disclosing the following features: 1) proportional force feedback, 2) remote control by radio, 3) proportional angular control, 4) electric, hydraulic, or pneumatic control power choice, and 5) master and slave being other than one-to-one in physical size. All such features are compatible with the instant invention, and proportional angular control is a specific option of the instant invention.

U.S. Pat. No. 3,268,092 to Hainer et al. discloses a pedestal mounted (floor mounted) support structure disclosed as desirable because the smaller the support structure, the less it is likely to interfere with the manipulation. Such a mounting is not essentially unique since manipulators have been mounted on columns, posts, tables, cranes, and vehicles. The mounting of the instant invention, to the extent it is considered a novel aspect, is at an angle, whereas the Hainer et al mounting is vertical.

U.S. Pat. No. 3,661,276 to Wiesener describes a compensating counterweight mechanism, whereas the instant invention employs a joint structure which presents no need for compensation.

U.S. Pat. No. 3,664,517 to Germond et al is another example of a hot-laboratory mechanism.

The instant invention was particularly designed for remote application in space, and the slave segments are counterweighted to simulate operation in space. Developments such as the instant invention will extend man's capabilities through distance and barriers and into hostile environments.

SUMMARY OF THE INVENTION

The primary object of this invention is to provide a manipulator for remote applications in space, and, specifically, to provide a manipulator for demonstration and testing on the ground in zero and variable gravity simulations.

A related object is to provide a manipulator operative as an earth-demonstration model to obtain the engineering basis for the development of a space-rated, multipurpose teleoperator system.

It is another object of this invention to provide a remote manipulator useful for conventional applications, such as for an arm-brace component used in medical research.

It is another primary object of this invention to provide a low-cost, master-slave manipulator with greater force and reach capabilities than other existing low-cost, master-slave manipulators.

It is an important object of this invention to provide a manipulator which is well suited for reaching around obstructions in the work area.

It is a more specific object of this invention to provide a manipulator with internal parts, thereby better exemplifying space hardware.

It is also a more specific object of this invention to provide a manipulator having a wide range of joint motions and a large slave working volume.

It is another, more specific object of this invention to provide an electrical circuit for a manipulator having increased reliability and reduced noise.

It is another, more specific object of this invention to provide a manipulator readily convertible for underwater neutral buoyancy testing.

The instant invention has the following advantages:

1. Large working volume — The volume is approximately four times that on an anthropomorphic manipulator.
2. Free operator motion — The operator is restricted only to a fixed area at which the masters are mounted.
3. Pedestal mounting.
4. Low fatigue from counterbalanced structure — A potential exists to over-counterbalance the master to further reduce operator fatigue by letting the master hold the weight of the operator's arm.
5. Joint locking — Joint locking in response to trigger release in the master also provides reduced operator fatigue since the master is then self-supporting.
6. Force feedback may be added.
7. Fully electrical for remote space compatibility.
8. Natural operation.
9. Six degrees of freedom.
10. Simultaneous motion of joints — The operator instinctively knows the position of the slave.
11. Ease of control of the gripping device — The end effector roll and the end effector apprehension are controlled by a four way thumb switch for operator comfort and elimination of fatiguing awkward hand positions.
12. Few operators contortions — Most standard work is performed without operator contortions.

The instant invention eliminates or substantially decreases the following undesirable features.

1. Operator fatigue — The time an operator can work on skilled tasks is thereby substantially increased.
2. Limited degrees of freedom — The instant invention has six degrees of freedom and is compatible for adding up to two additional degrees of freedom.
3. Limited alternative controls — The instant invention is compatible for addition of computer assist, force feedback, and other control variations.
4. Disorientation — The operator knows instinctively the geometry of the slaves.
5. Impaired working volume — The operator can move and work in an area in which he would normally be standing.

6. Restriction of joint movement — Joints such as the elbow can be bent both ways.

7. Awkward arm positions — Such positions are reduced by providing the end effector roll and apprehension on a thumb switch.

8. Lack of stationary hold — A joint lock responds to the trigger release.

9. Operator assistance — The operator needs no help to be strapped in to or out of the master.

The master units of the instant invention require a very large area and are not suited to confined spaces. The preferred structural design of both right and left master and slave are identical to reduce cost, and the units use standard, off-the-shelf hardware.

In accordance with this invention a remote manipulation system comprises at least one master unit and at least one slave unit. Both the master and slave units have a first arm member mounted on the floor and adapted to rotate, a second arm member pivoted to the first member and adapted to rotate, and a third arm member pivoted to the second member. Servomechanism systems drive the parts of the slave to the position of the corresponding parts of the master. A hand unit with grasping means in the slave is pivoted to the third arm and adapted to rotate. Manual controls for the slave hand are provided at the hand end of the master. In the preferred embodiment the first arm is mounted at 30° from the vertical. The master contains a loop through which the arm of the operator is inserted to provide a link to the master during operation. A specific, solid-state servomechanism circuit is disclosed.

Other objects, features, advantages, and characteristics of the invention will be apparent from the following description of a preferred embodiment, as illustrated from the accompanying drawings.

DETAILED DESCRIPTION OF THE INVENTION

The Master-Slave System

Figure 1:
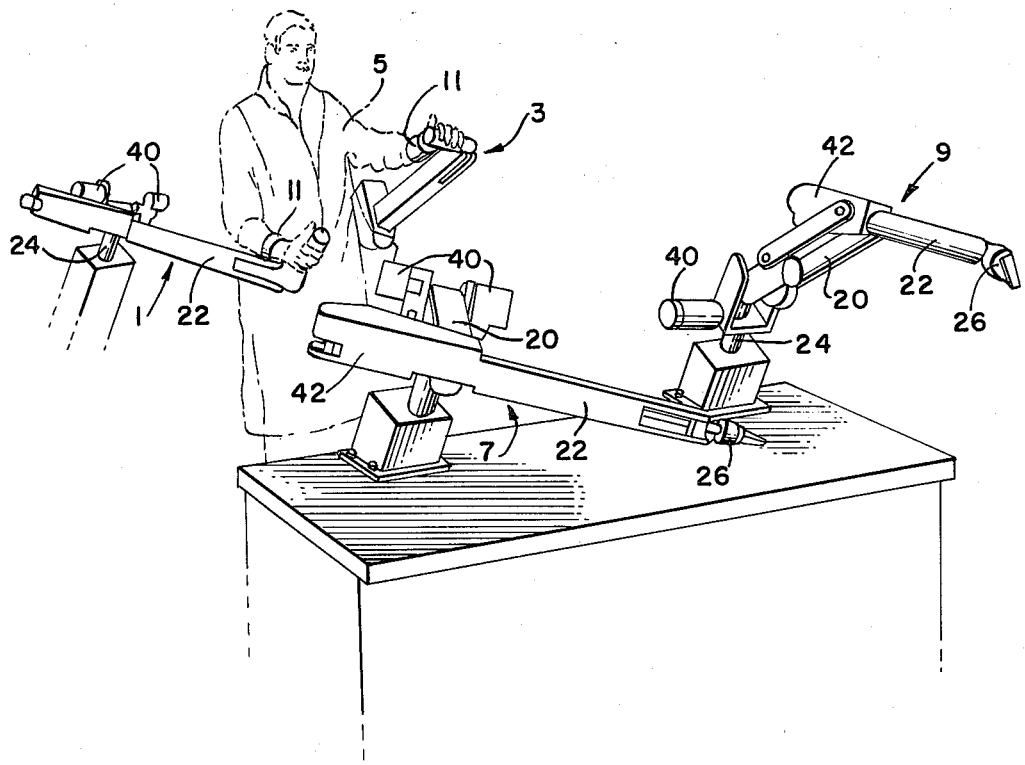
FIG. 1 shows both the masters and slaves with an operator.

The general configurations of the manipulator system is shown in FIG. 1. The system is in the category of remote, electrically-driven, master-slave, unilateral manipulators. More specifically, the system comprises master control units 1 and 3 (one for each of the two arms of the operator 5), and the slave units 7 and 9, which follow or duplicate the motions of the master unit 1 or 3 corresponding to each slave unit. The term unilateral denotes that no force or position information is returned by the slave to the operator 5 controlling the master. Each master unit 1 and 3 has an open loop member 11, near the free end of each unit 1 and 3, through which the operator 5 inserts his arm unassisted. The operator's arm is then harnessed to the unit 1 or 3, and the operator 5 pulls upon the loop 11 to control movements. Master units 1 and 3 are separated enough so that the operator 5 may be positioned between them as shown while controlling both.

This general design departs from previous manipulator designs in several respects. First, the kinematic arrangement provides an extremely large working envelope, as described below. Second, the master units 1 and 3 are not controlled solely be hand placement, as is conventional with hot-laboratory manipulators, nor by an exoskeleton approach, but instead control is by the semi-harness design employing loops 11. Finally, the arms are designed so that, optionally, appropriate seals could be added to allow shallow-depth underwater operation.

The master units 1 and 3 incorporate brakes such that releasing the master may automatically lock the master into position. Additionally, the master-slave control interrelationships are designed to be adjustable over discrete steps to provide a range of gains, a typical adjustment being a one-degree movement of the master elbow joint producing a five degree movement of the slave elbow joint.

Manipulator Unit Structure

Figure 2:
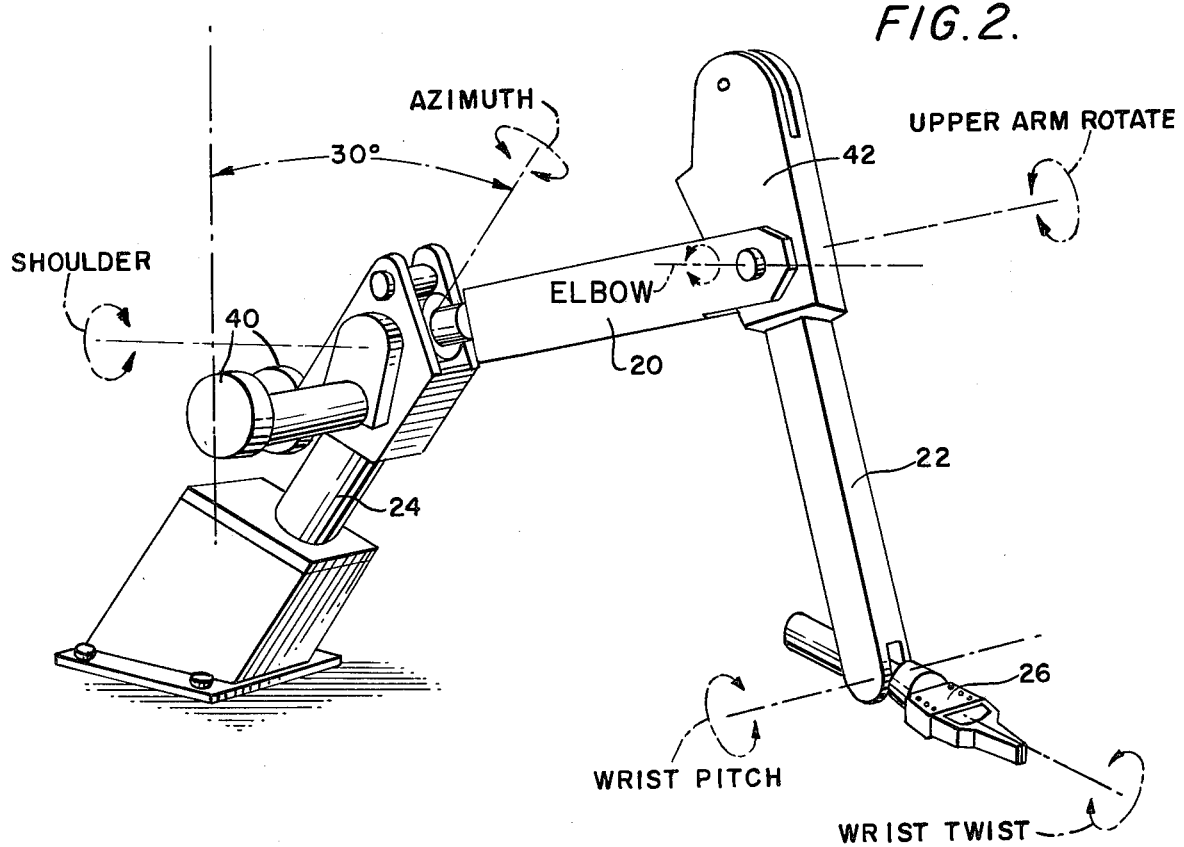
FIG. 2 is a detailed illustration of a slave unit.

Reference is made to FIG. 2, which shows in detail the external operating structure of a slave unit 7 or 9. It should be understood that the master and slave units are basically identical to and including the pivoted area of the wrist or gripper element. The right and left units of the master units and of the slave units are identical to each other. The master units 1 and 3 at the wrist end includes thumb operated switch controls for convenient manipulation by the operator to control rotation and opening and closing on an item by the hand of the corresponding slave unit.

The upper arm 20 is 18 inches in length between pivoted ends and the lower arm 22 is 24 inches in operative length. The support arm 24 is mounted on the floor support at 30° from the vertical. Degrees of freedom are provided in each arm and element as follows: rotation of support 24 (shoulder rotation) - ±170°, pivoting of the upper arm 20 — +220°, down to 0°, rotation of the upper arm 20 — ±170°, pivoting of the lower arm 22 — −60 to +140°, pivoting of the wrist or gripper element 26 — ±90°, and rotation of wrist 26 — minimum ±270°.

The slave units 7 and 9 are capable of lifting six pounds without slipping when the arms are fully extended, and items can be positioned to an accuracy of 0.1 inch with maximum speed of an extended slave unit being about 30 inches per second. The design was dictated by the need to minimize costs and agrees with the technical goal of master and slave being similar in size.

Manipulator in Operation

Typical hot-laboratory manipulators have three arm motions for transport and three wrist motions for orientation (in addition to an opening and closing motion of a gripper). The instant invention has four arm motions and two wrist motions, the basic advantage of which is the flexibility of reach which the unit possesses. Since it can reach a point in its working volume with a variety of upper and lower arm positions, the capability to reach around and through obstacles is much greater. Another advantage is the reduced weight and lack of complexity at the wrist.

The lack of the third wrist motion has disadvantages, which are recognized and accepted in the overall design. To orient the gripper tongs along a prescribed line, the entire slave must be properly positioned, and the proper arm placement is not always obvious. Also, it is this design approach which requires the operator to be harnessed in loop 11, so that he can control the position of the lower arm 22. Small movements of the gripper unit 26 often require movement of the arm 22 or of the entire slave unit, and this limits the accuracy of small changes as larger master arm masses must be moved and controlled. Similarly, since the upper arm 20 and the lower arm 22 are much larger in size than the wrist or gripper 26, given the same servo precision, more inaccuracy will result. Another disadvantage is the complexity added to the design in electrical cabling and counterbalancing.

The six motions are illustrated in FIG. 2 and are described in detail immediately following.

1. Azimuth Rotate — The axis of support arm 24 is tipped 30° forward from the vertical and the rotation is around that azimuth. This allows the upper arm 20 to rotate vertically down and also puts the joint of arms 24 and 20 (the shoulder joint) forward from the base to give better clearance. The maximum no-load speed of this joint is about 50° per second, and it has a torque rating of 300 inch/pounds.

2. Upper Arm Pivot — This is the pivoted connection between arm 24 and arm 20. The axis of rotation is perpendicular to the azimuth axis, which is out of the vertical plane since the arm 24 is pointed forward, as illustrated in FIG. 2. The maximum no-load speed of this joint is about 45°/second, and it has a torque rating of 300 inch/pounds.

3. Upper Arm Rotate — The axis of this joint goes through the intersection of the above two joint axes. This gives the equivalent of a ball or spherical joint at the shoulder, like that of the human shoulder. Although a shoulder motion, this joint, along with the next joint, orients the lower arm. The maximum no-load speed is about 60°/second, and it has a torque ratio of 190 inch/pounds.

4. Lower Arm Pivot (Elbow) — This is the pivoting of arm 22 at the end of arm 20. Accordingly, to this point, the kinematics of the shoulder and elbow are identical to the human arm. The maximum no-load speed of this joint is about 76°/second, with a torque ratio of 190 inch/pounds.

5. Gripper Unit (Wrist) Pivot — The axis is perpendicular to the longitudinal axis of the lower arm 22. The speed is rated at 83°/second and the torque at 50 inch/pounds.

6. Gripper Unit (Wrist) Rotate — The axis of rotation of the wrist or gripper unit 26 is perpendicular to the axis of pitch above. At the master unit, because the operator is harnessed to the lower arm just above his wrist, it would be very difficult for him to both twist and pitch the master control grip. This motion is therefore not controlled by directly corresponding movements, but is controlled in an on-off manner from a directionally-oriented switch mounted on the grip. At the slave gripper unit rotation has a speed of 140°/second and a torque rating of 25 inch/pounds.

Counterbalancing

Counterbalancing of the master units is a known feature to reduce operator fatigue. In the instant design, where the slave units are counterbalanced to simulate space operation, counterbalancing of the master provides uniformity in manufacturing. The counterbalancing of the slave units also increases the load carrying capacity of the slaves.

Two main sets of counterweights 40 are located behind the shoulder formed between support arm 24 and upper arm 20. Since the rotation of the upper arm 20 allows the lower arm 22 to swing out of the vertical plane and since the entire unit is mounted at 30° from the vertical, counterbalance must be obtained around all three shoulder axes. The sum of the two sets of weights 40 offsets the shoulder joint unbalance, and balance about the 30° azimuth axis is obtained by adjusting the amount between right and left set.

Counterweight of rotation of the upper arm 20 is effected by adjusting the location of the elbow joint counterweights, located in counterweight housing 42 on the slave units 7 and 9, whereas the master unit does not require the elbow counterweights and has counterweights added near the shoulder axis. Counterweight housing 42 is an extension of lower arm 22 located on the side of the pivot away from gripper unit 26.

Because of the large range of motions of the design, packaging the units to meet the counterbalance requirements requires careful engineering. The elbow and wrist joints become the most critical problems as indiscriminate weight at those locations also appears at the shoulder. A miniature chain and tie rod transmits the motion to the wrist. This requires the upper arm to allow the motor package to pass through the upper arm (which also reduces the upper arm and elbow joint stiffness). The counterweight to the pivot or pitch of wrist 26 is located in housing 42, where it also provides balancing about the elbow joint. Rotation of the wrist 26 is inherently counter-balanced by the symmetry of the part.

Gripping Unit (Wrist) Structure

A lightweight gripping unit 26 greatly reduces the counterbalancing problems. Commercially available grippers used in hot-laboratory systems having parallelogram linkage are lightweight, and such an element is used, along with a permanent magnet torque motor to drive the linkage through a worm gear drive.

This hand weighs about 20 ounces, develops over 10 pounds of closing force, and, with the addition of seals, is compatible for underwater work. The hand is self-locking and requires no power to hold its grip on an object.

Physical Construction

The arms 20, 22, and 24 are built of conventional aluminum weld construction to obtain a lightweight product. Stainless steel is used where added strength is needed. To adapt the preferred embodiment to future underwater operation, the contruction is heavier in places then would be needed for strength and stiffness purposes alone.

The largest, readily-available permanent-magnet servo motors with attached planetary gearheads are employed with electronic controls, to minimize costs. Such units come in a variety of gear ratios which permits flexibility in later modifications to the arms. Thus, slow speeds, with smoother motion owing to lower reflected inertias, and higher force levels are easily obtained by a simple replacement of the gear motor.

The primary disadvantage to the planetary gearhead is its inherent backlash which was specified in the commercial product as a maximum of three degrees. To compensate, where possible, a precision spur or bevel gear set was placed between the gear motor and the output arm motion. For example, the support arm 24 gearhead drives through a 4.5 to 1 spur gear set. With precision machining of the center distance to minimize backlash in the spur gear set, the three-degree backlash in the planetary will appear only as 0.67 (3/4.5)° backlash at the arm.

To minimize profile and provide protection, potentiometers used in the servomechanism are packaged internally. Film potentiometers were employing using three or five turns, which were spur-gear driven off of the motor shaft. These were chosen instead of the more preferable direct-output mounting for packaging reasons.

Figure 3:
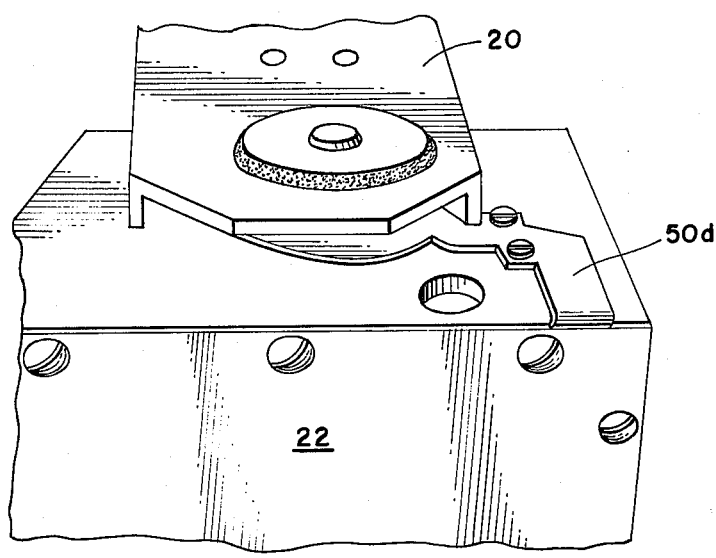
FIG. 3 emphasizes the use of an electrical ribbon used for transmission of signals as employed in an elbow joint.
Figure 4:
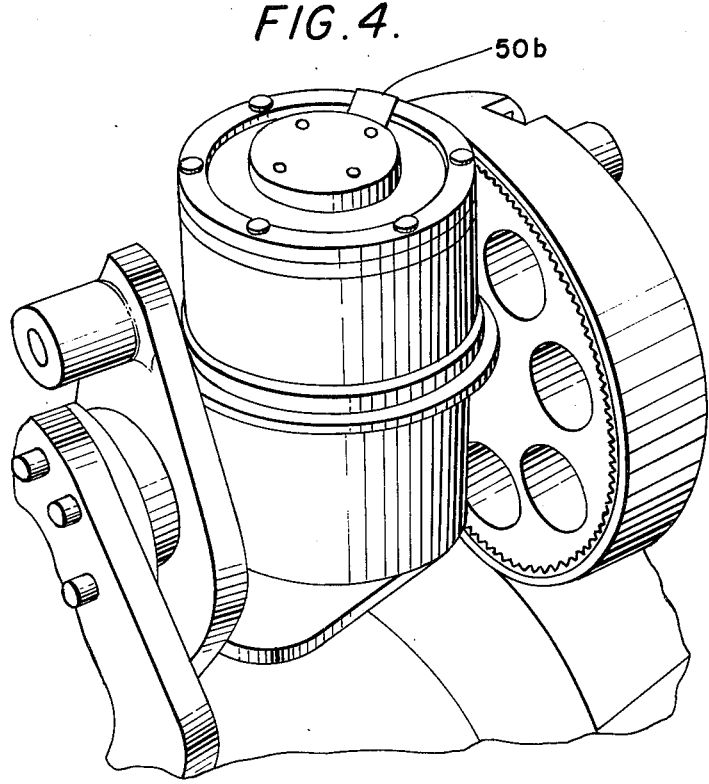
FIG. 4 shows a rotate joint with the electrical ribbon used for transmission of signals.

To improve the mechanical reliability of the design without excessive voltage drop in the wiring, flat ribbon cables are used as the internal electrical connectors. The flat ribbon cabling starts below the upper arm 20 area of rotation, forms a 6–7 turn helix in the upper arm 20 rotate cavity, and terminates in a plug mounted on the upper arm 20. From that point another flat ribbon cable extends along the upper arm 20 into a multiturn helix around the elbow axis between arms 20 and 22, and thence into the elbow motor cavity. FIG. 3 illustrates the pivotal connection between arms 20 and 22, and shows the unique property of the flat ribbon cable 50a in that it is bent and held in place to avoid interference with the operation of the joint. FIG. 4 shows the flat ribbon cable 50b where it comes out of the upper arm rotate cavity. The retaining disk holds the helix in place.

Servomechanism Controls

Figure 5:
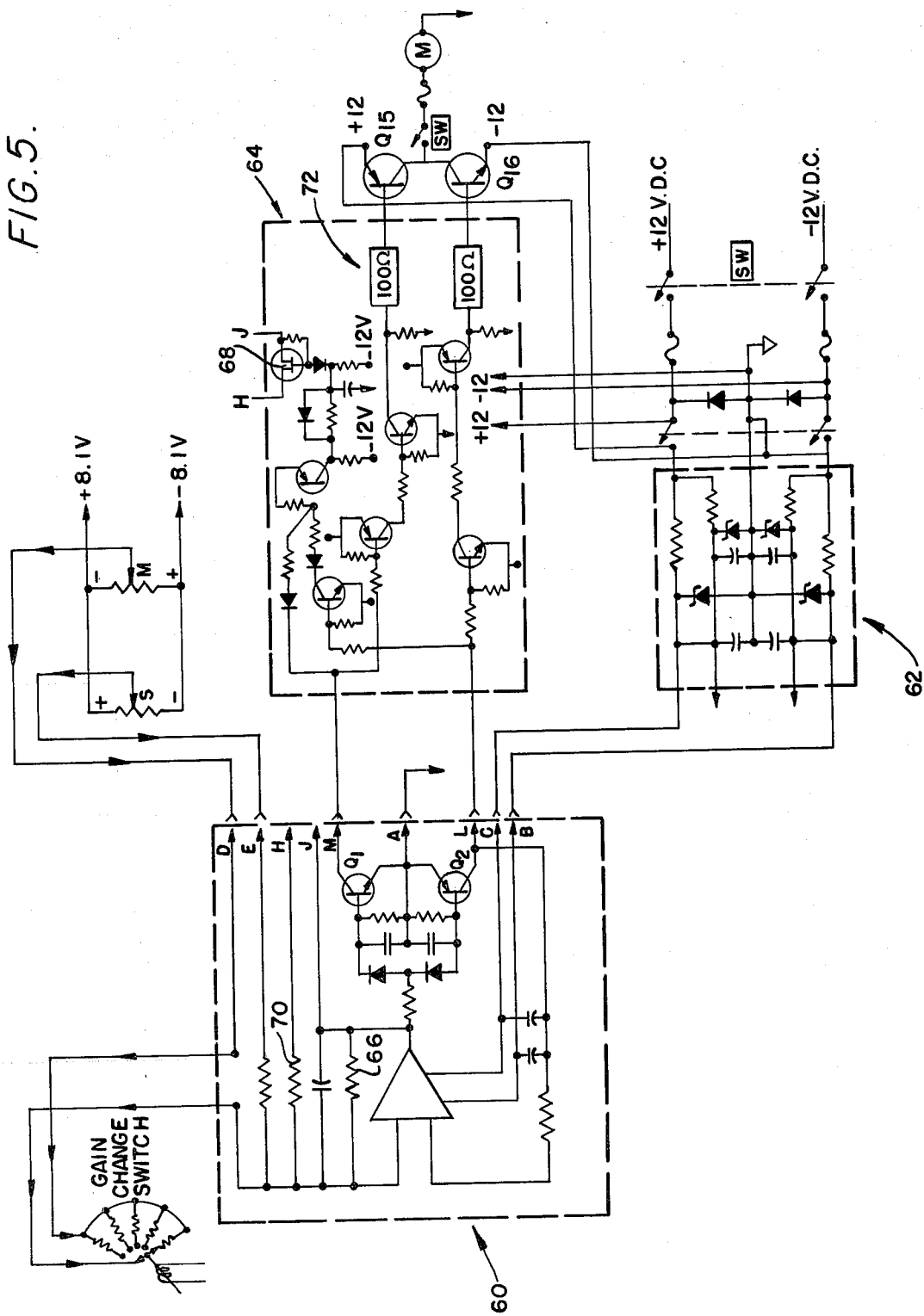
FIG. 5 is a schematic diagram of the all solid-state servomechanism circuit employed.

Servo controls previously used for a smaller manipulator system were modified to eliminate the electromechanical relays in the prior system to provide increased reliability and reduced noise. The final circuit is shown in FIG. 5, which is a simplified, low cost design, balancing cost and performance. The operational amplifier 60 was essentially the same as the prior design. A standard, power-conditioning subassembly 62 is added to provide ±8.1 volts to the potentiometers and ±6.2 volts to the operational amplifier 60.

In the previous circuit, electromechanical relays were operated by output transistors, $Q_1$ and $Q_2$. The functions of the relay were replaced by a solid-state switch subassembly 64, as shown.

The first function of the relay was to lower the gain of the operational amplifier for small error signals by shunting a resistor across the 1M ohm feedback resistor 66. This function is now accomplished by the field effect transistor 68 and its associated circuitry. At a predetermined level of output signal from amplifier 60, a sufficient signal is applied to the gate of transistor 68 to gate that transistor open. A circuit is then completed from 33K ohm resistor 70 through transistor 68, which bypasses 1M ohm resistor 66.

The second relay function was to switch the output drive transistors, $Q_{15}$ and $Q_{16}$, on and off. This is replaced by the essentially conventional transistor-switching circuits 72.

The net effect is similar to the previous results, which were a train of plus or minus 12 pulses applied to the motor. The width and frequency of the pulses depend upon the magnitude of the error signal applied to the operational amplifier 60 by the master and slave potentiometers. The revised, fully solid-state circuit provides a narrow, high-frequency pulses width which improves the motor drive characteristics.

Servo compensation is obtained by the lag network in the operational amplifier 60. Additional of a lead network has been found to result in overall lower performance, and therefore is not employed. Also, no rate or velocity feedback is employed, so the embodiment does not perform smoothly because of the absence of damping. Gain control between master and slave is provided by a stepping rotary switch which changes the master input resistance to the operational amplifier. As a point of caution, when making step changes in gain, the arm should be near its null position to avoid large, uncontrolled movements.

Conclusion

Initial evaluation suggests that the preferred embodiment described fully meets the basic objectives of hardware at minimum cost which is adequate to evaluate the kinematic functions, human factors, and operating capabilities inherent in the manipulator. The instant manipulator constitutes a completely new system with a number of innovations and differences as compared with other existing manipulator systems.

As innovations, the instant embodiment has an extremely long range of movement for a counterbalanced manipulator system. This is accomplished by a longer reach, twice that of the human arm, and large angular movements in the joints, which again exceed that of the human arm. The counterbalanced arm allows more uniform motion and is a needed feature for earth-based simulation of operation in space. Even though the units are long, they have a high-speed capability. The units have the capability of being sealed for underwater neutral buoyancy work and have a clean outside design with neither cabling, potentiometers, motors, nor gearing exposed. Slip rings could readily be added at the wrist to permit continuous rotation, thus allowing use as a screwdriver or the like.

Specific aspects of the design can be modified to provide smoother operation, where the cost is justified. This can be accomplished in one manner by slowing the speed by employing different gearheads, since that will reduce the motor reflected inertia and the kinetic energy of motion. Some increased stiffness of the elbow and the upper arm joint would also contribute to better operation.

As negative aspects, the lack of the third wrist motion results in awkward motions for certain operations. Also, the azimuth or support arm axis and the upper arm rotate axis are often in near alignment, resulting in difficulty in controlling the position of each motion. The lack of brakes in the slave limits the switch-controlled, weight-handling capacity, and if this mode is to be used often with objects weighing more than 1.5 pounds, brakes appear to be necessary. A master smaller in overall size appears appropriate because large motions of the arm are needed for small changes in position of the hand. Other servo systems, for example those with rate feedback, would improve performance.

Other variations of the invention described will be apparent, and variations may well be developed which employ more than ordinary skill in this art, but nevertheless employ the basic contribution and elements of this invention. Accordingly, patent protection should not be essentially limited by the preferred embodiment disclosed, but should be as provided by law, with particular reference to the accompanying claims.

We claim:

1. A remote manipulator system comprising a master unit and a slave unit controlled by signals from said master unit, said master unit and said slave unit each separately comprising an elongated support arm mounted on a floor for rotation about its longitudinal axis, said support arm being mounted on said floor at about a 30° angle from an imaginary line perpendicular to said floor; an elongated upper arm; means mounting one end of the upper arm on the end of the support arm remote from the floor for pivotal movement of the upper arm about an axis perpendicular to the longitudinal axis of the support arm and for rotational movement of the support arm about its longitudinal axis; a lower arm having one end connected to the other end of the upper arm for pivoting the lower arm about an axis parallel to the axis about which the upper arm pivots on the support arm; servomechanism means for causing the individual arms of said slave unit to occupy the same relative position as the corresponding arms of said master unit; a gripper unit having an operable holder thereon adapted to grasp and release items; means mounting said gripper unit on the other end of the lower arm of said slave unit for pivotal movement and rotational movement about two mutually perpendicular axes; manually manipulatable control element means positioned at the other end of said lower arm of the master unit; and communication means communicating the status of said manually manipulatable control element means to said gripper unit for controlling the pivotal movement of the gripper unit and operation of said holder.

2. The manipulation system as in claim 1 in which said arms in said slave unit are counterbalanced so that said slave unit simulates operation in the absence of gravity.

3. A remote manipulator system comprising a master unit and a slave unit controlled by signals from said master unit, said master unit and said slave unit each separately comprising an elongated support arm mounted on a floor for rotation about its longitudinal axis; an elongated upper arm; means mounting one end of the upper arm on the end of the support arm remote from the floor for pivotal movement of the upper arm about an axis perpendicular to the longitudinal axis of the support arm and for rotational movement of the support arm about its longitudinal axis; a lower arm having one end connected to the other end of the upper arm for pivoting the lower arm about an axis parallel to the axis about which the upper arm pivots on the support arm; servomechanism means for causing the individual arms of said slave unit to occupy the same relative position as the corresponding arms of said master unit; a gripper unit having an operable holder thereon adapted to grasp and release items; means mounting said gripper unit on the other end of the lower arm of said slave unit for pivotal movement and rotational movement about two mutually perpendicular axes; manually manipulatable control element means positioned at the other end of said lower arm of the master unit; and communication means communicating the status of said manually manipulatable control element means to said gripper unit for controlling the pivotal movement of the gripper unit and operation of said holder, said servomechanism means comprising potentiometers, the output of which are controlled by the positions of the said arms, said potentiometers being generally identical in operation in both said master unit and said slave unit, and in which said slave unit is driven by motors responsive to pulses created in response to the difference between values of the output of corresponding ones of said potentiometers in a said master unit and a said slave unit, said pulses being created in a circuit having only solid-state active elements, including a field effect transistor with its gate connected to respond to signals proportional to said difference in values of a predetermined magnitude to close a circuit across said field effect transistor which lowers the gain of the signals from said potentiometers to thereby reduce said drive signals.

4. A remote manipulator system comprising a master unit and a slave unit controlled by signals from said master unit, said master unit and said slave unit each separately comprising an elongated support arm mounted on a floor for rotation about its longitudinal axis; an elongated upper arm; means mounting one end of the upper arm on the end of the support arm remote from the floor for pivotal movement of the upper arm about an axis perpendicular to the longitudinal axis of the support arm and for rotational movement of the support arm about its longitudinal axis; a lower arm having one end connected to the other end of the upper arm for pivoting the lower arm about an axis parallel to the axis about which the upper arm pivots on the support arm; servomechanism means for causing the individual arms of said slave unit to occupy the same relative position as the corresponding arms of said master unit; a gripper unit having an operable holder thereon adapted to grasp and release items; means mounting said gripper unit on the other end of the lower arm of said slave unit for pivotal movement and rotational movement about two mutually perpendicular axes; manually manipulatable control element means positioned at the other end of said lower arm of the master unit; and communication means communicating the status of said manually manipulatable control element means to said gripper unit for controlling the pivotal movement of the gripper unit and operation of said holder, said manually manipulatable control element means including a member pivotally mounted on said lower arm of the master unit, said communication means being effective to pivot said gripper unit to the same relative pivotal position as the pivotal position of said member on the master unit, said manually manipulatable control element also including a finger operated switch for controlling operation of the operable holder, said manipulator system comprising two master units as described mounted on said floor separated sufficiently to be operated together by the different arms of one person, two slave units as described, each controlled by the said master unit corresponding to it in position, and two support arms as described, each said support arm being mounted to the floor at about a 30° angle from an imaginary line perpendicular to said floor.

5. The manipulation system as in claim 4 in which the said lower arm of each said master units has an external loop member attached to it and adapted to receive the lower part of the arm of a person operating the master unit.

6. The manipulation system as in claim 5 in which said servomechanism means comprises potentiometers, the output of which are controlled by the positions of the said movable members, said potentiometers being generally identical in operation in both said master units and said slave units, and in which each said slave unit is driven by motors responsive to pulses created in response to the difference between values of the output of corresponding ones of said potentiometers in a said master unit and a said slave unit, said pulses being created in a circuit having only solid-state active elements, including a field effect transistor with its gate connected to respond to signals proportional to said difference in values of a predetermined magnitude to close a circuit across said field effect transistor which bypasses the signals from said potentiometers to thereby reduce said drive signals.

7. The manipulation system as in claim 5 in which said arms in said slave unit are counterbalanced so that said slave unit simulates operation in the absence of gravity.

* * * * *